United States Patent [19]

Roberts et al.

[11] Patent Number: 5,799,756

[45] Date of Patent: Sep. 1, 1998

[54] SURELOCK WHEELCHAIR BRAKES

[76] Inventors: John Steven Roberts, 116 S. Fairview, Liberty, Mo. 64068; Jack E. Roberts, Rte. 1, Box 28, Lewis, Kans. 67552-9541

[21] Appl. No.: 828,581

[22] Filed: Mar. 31, 1997

[51] Int. Cl.$^6$ ................ B60T 1/00; B62M 1/14
[52] U.S. Cl. ................ 188/2 F; 188/31; 188/69; 280/250.1; 280/304.1; 74/501.6
[58] Field of Search ................ 188/2 F, 24.18, 188/31, 68, 69; 280/250.1, 304.1, 647, 650, 658; 74/97.1, 97.2, 100.1, 100.2, 411.5, 501.6

[56] References Cited

U.S. PATENT DOCUMENTS

| | | | |
|---|---|---|---|
| 2,621,523 | 12/1952 | Taylor | 74/100.1 |
| 2,966,969 | 1/1961 | Morse | 74/501.6 |
| 3,316,776 | 5/1967 | Schroter | 74/97.1 |
| 3,400,606 | 9/1968 | Schroter | 74/97.1 |
| 4,671,133 | 6/1987 | Yamada | 188/31 |
| 4,733,755 | 3/1988 | Maning | 188/31 |
| 4,762,332 | 8/1988 | Seol | 280/250.1 |
| 5,211,414 | 5/1993 | Galumbeck | 188/31 |
| 5,365,804 | 11/1994 | Downs et al. | 188/31 |
| 5,401,094 | 3/1995 | Galumbeck | 188/2 F |
| 5,685,406 | 11/1997 | Crun et al. | 188/31 |

*Primary Examiner*—Robert Oberleitner
*Assistant Examiner*—Chris Schwartz

[57] ABSTRACT

A brake system for a wheelchair is disclosed. The brake may comprise two assemblies one for each of the wheels. Each brake comprises a mounting bracket adapted to be connected to a frame portion of a wheelchair, a handle pivotally attached at a pivot point to the mounting bracket, a cable having one end connected to the handle and another end connected to a pivot arm. The pivot arm is pivotally attached to one end of a cam rod. The rod is attached to another mounting bracket adapted to be connected to another frame portion of the wheelchair and has a latching mechanism connected to a portion of the rod and biased into engagement with a splined disc by a spring. The disc is adapted to be connected to a hub of the wheel chair. In use, when the occupant of the wheel chair pivots the handle past a certain rotary position with respect to the pivot point of the handle, either in a forward or rearward direction, the spring forces the latching mechanism into either a positive braking engagement with the disc, thereby locking the wheelchair against movement, or a released position in which the wheelchair is free to move.

7 Claims, 3 Drawing Sheets

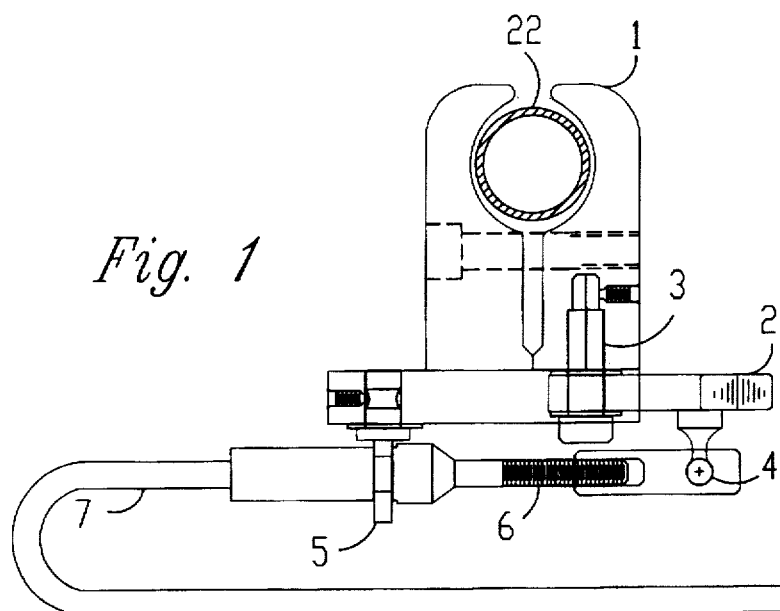
Fig. 1
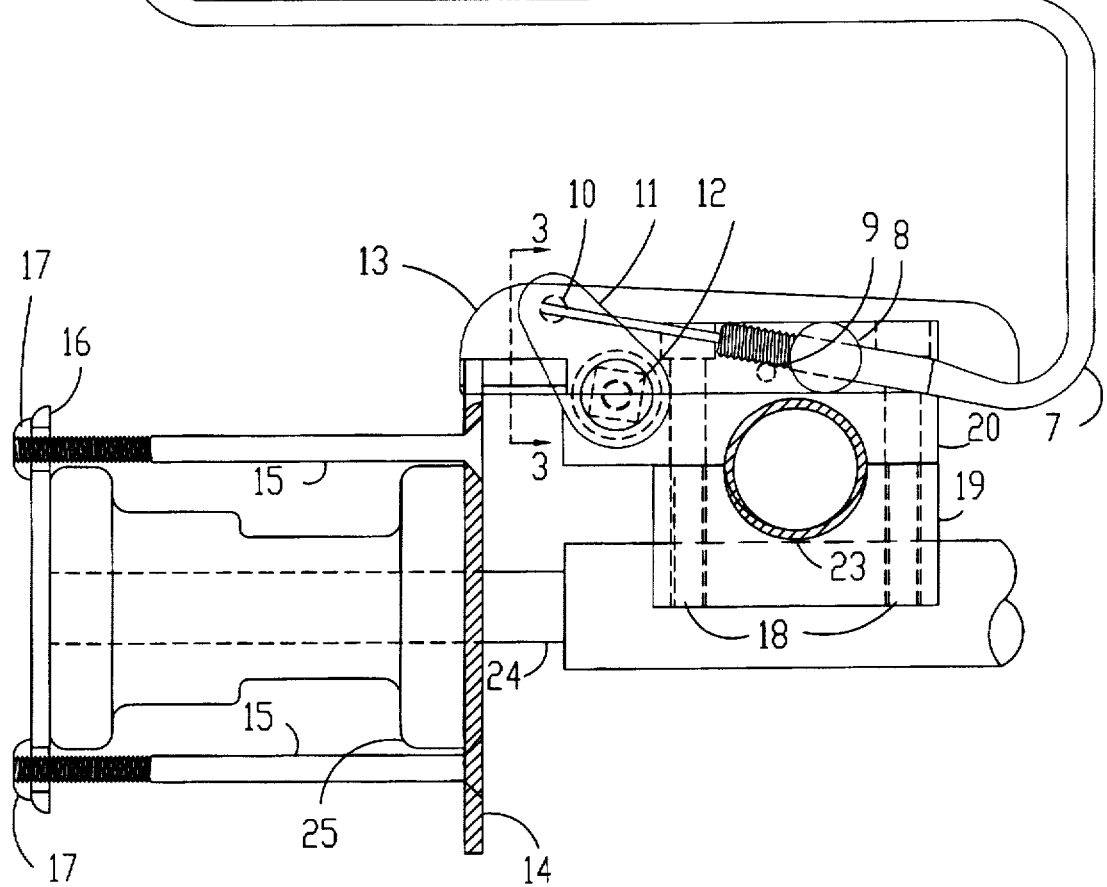

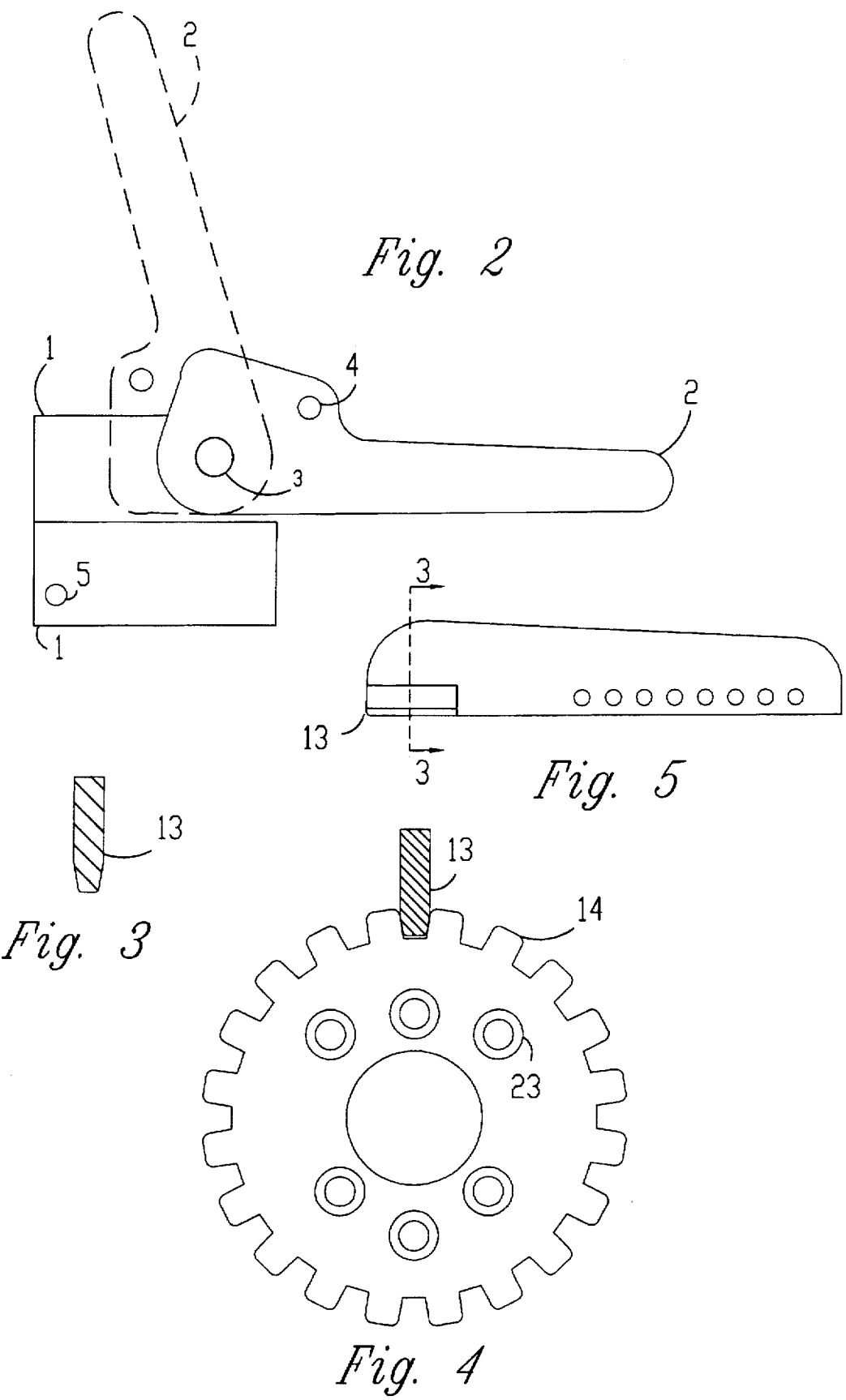

SURELOCK WHEELCHAIR BRAKES

BACKGROUND OF INVENTION

The invention being presented applies to a wheelchair where the occupant by hand movement propels himself to his destination with the aid of two circular rims mounted to the outside of the driving wheels of the wheelchair and two smaller wheels mounted to the wheelchair frame in front of these driving wheels. The present braking systems being applied consist of friction devices that contact the rubber on the driving wheel which are not positive in holding the occupant in the desired position such as on the sloping floor of a theater where the occupant finds himself in the orchestra pit because his brakes would not hold him. In other cases where those whose industrial occupation calls for force to be exerted against objects their wheelchair must be held in place and not slide as on the friction devices.

The improvement of the present invention gives a positive surelocking braking system for both the forward as well as the rearward movement of the wheelchair. The prior art brake devices prohibit movement just in the rearward direction or have to be expensively incorporated into the hub of the manufactured wheelchair.

This problem, however, is readily solved without changing the design of the occupant's wheelchair as the surelocking braking mechanism is provided as a unit that dealers can readily install in a matter of minutes.

Another improvement over the prior art is that the system does not make a lot of noise by the ratcheting action of a pawl sliding over a serrated gear which would be calling attention to the wheelchair occupant. Many people find this to be objectionable, whereas with the surelocking braking unit positive braking action is accomplished in both directions without any noise at all and is done with one finger of the wheelchair occupant.

BRIEF SUMMARY OF THE INVENTION

It is an important object of the present invention to provide the occupant of a wheelchair with a reliable brake which will not slip either in the forward or rearward directions. Ease of installation of the brake is unique for either new manufactured wheelchairs or those who desire to retrofit brakes on their existing wheelchairs.

In connection with the improvements of our present invention the handles activating the present braking system are held in their locked or unlocked position due to the hole location on a mounting bracket and constant spring tension from a spring and an attached cable. The system incorporates a novel handle arrangement which can be moved with one finger. When the brakes are activated, the handles are extending outwardly from the frame of the wheelchair. When the occupant would be using the wheelchair for movement, the handles are out of the way for no unwanted contact with the occupant's hands. The handles are thereby attached to a flexible cable which is next connected to a pivot arm which in turn is attached to a rolling cam that operates the spring loaded latch into the disc brake.

The spring allows constant tension to be applied to the handle that makes for an easy and effective engagement of the brakes as well as brake release. When either of the handles is pulled in the outward position the latch engages the disc brake making the surelock braking action. The discs are notched with an angular taper to the sides of the notches allowing for easy disengagement. The latch that engages the disc is also tapered with the same angle that the slot in the disc has so that it compensates for any wear and automatically adjusts for positive braking action.

Another advantage of the invention is that the wheels of the wheelchair can be removed without releasing the brakes. When the occupant of a wheelchair (without surelock brakes) releases the brakes as he is entering his automobile, he first has to release the brake on one wheel and then the other wheel in order to remove the wheels and sometimes the wheelchair gets away from him because the operator is holding on to the automobile with one hand and with the other hand he is manipulating the brake handles of his wheelchair. With surelock brakes this does not happen because the latch that engages the disc is parallel to the axis of the wheelchair, therefore, the wheels can be readily removed without having to deal with the handle operating the brakes.

It should also be noted that with surelock brakes, both wheel brakes can be operated with one single handle.

BRIEF DESCRIPTION OF THE DRAWINGS

FIG. 1 Shows one of two braking system arrangements mounted to the wheelchair with one of the special handle arrangements.

FIG. 2 Shows the handle movement and special action achieved by the location of the mounting points.

FIG. 3 Is a cross-section of the latch used in the braking system showing the tapered ends.

FIG. 4 Shows a view of brake sprocket with the latch engaged.

FIG. 5 Shows a side view of the latch with adjustable pivot points shown.

DESCRIPTION OF THE PREFERRED EMBODIMENT

Only 5 pieces of a manufactured wheelchair are shown: In FIG. 1 (22) is a cross section of the metal tubing of a wheelchair element, (23) is a cross-section of the lower frame of the wheelchair and (19) a wheelchair member. Element (24) shows the axle of the wheelchair and element (25) shows the hub of a standard wheelchair.

DETAILED DESCRIPTION OF THE DRAWINGS

Figure 6:
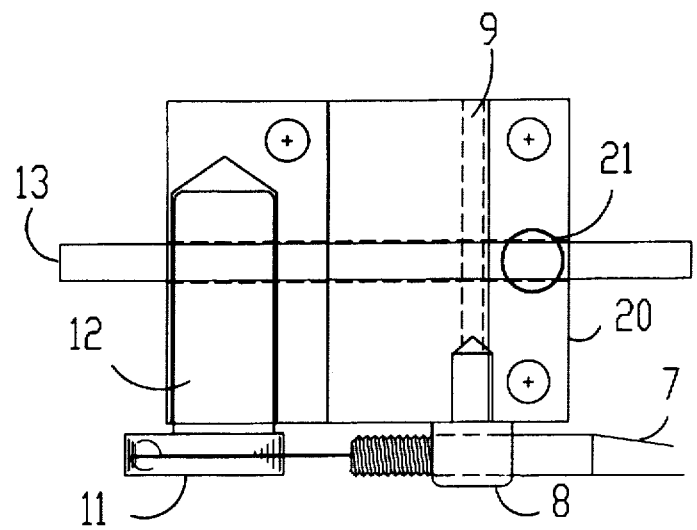
FIG. 6 Is a top view of the brake assembly showing the latch, cam-action shaft with the pivot arm and spring location in relation to a pivot point.
Figure 7:
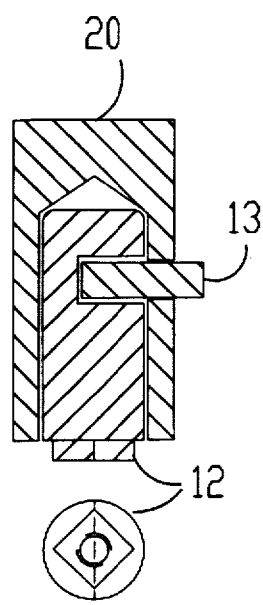
FIG. 7 Is a cross-section view of the latch, cam-action shaft and housing.

In FIG. 1 the mounting bracket (1) attaches to wheelchair frame (22) to provide a base for unique handle action as described herein. Handle (2) is attached to the mounting bracket pivot point (3) and a socket arrangement (4) which permits alignment of the cable with the handle. Cable pivot (5) provides a unique and easy to operate action of the handle as described hereby: Referencing FIG. 2 note the handle (2) with ball-pivot (4) and handle-pivot (3) in the locked position (dotted line). The handle at the ball-pivot (4) has spring tension from a spring (21) which is applied through a latch (13) to a rolling cam-rod (12) to a pivot arm (11) through cable sheath (7) to ball-pivot (4) thereby holding the handle (2) in the locked position. When the occupant of the wheelchair desires to release the brakes, with one finger he can move handle (2) just slightly where the socket arrangement (4) travels past an over center position of point (3) and an imaginary line drawn between elements (4) and (5) (see FIG. 2). This permits the handle to come to a resting position as shown by the solid line of FIG. 2. It is held in this resting position by the force of the spring (21) (see FIG. 6). The cable is also attached to mounting block (20) by pivot point attaching mechanism (8) which allows the cable to remain in alignment with pivot arm (11) as pivot arm rotates.

The improvements of the present invention consist of the following: FIG. 4 shows a disc (14) with notches that are tapered on the sides which permits easy engagement and disengagement of the latch (13) which has a matching taper and compensates for any wear between parts (13) and (14). The disc is quickly and readily connected to a wheelchair wheel hub (25) by means of screws (15) inserted through holes (23) in the disc (14) which are firmly engaged in a mounting disc (16). This brake does not ratchet when traversing up an incline or make noise and it is either engaged or disengaged providing positive braking/locking action when needed. The latch (13) that engages disc (14) is pivoted through a pin at point (9), thereby compressing the spring (21) in mounting block (20). The mounting block (20) is attached to a frame portion of the wheelchair by socket head cap screws (18). Note: (19) is an existing block of the wheelchair. The latch (13) is also provided with adjustment holes to allow for the adjustment of the wheels. The spring remains under tension as long as the occupant of the wheelchair wants to be moving about freely, but when he chooses to activate the positive braking action, with one finger, he reaches the handle (2) and moves it a few degrees. The handle (2) then causes ball-pivot (4) to allow the cable to have freedom of movement and due to the spring force, arm (11) is free to go to the resting position as shown in FIG. 2 with (12) rotating from the cam-up position to the cam-down position. The latch (13) then engages surelocking sprocket (14) causing the wheelchair to come to a positive stop.

It is to be understood that many modifications and alternatives can be made by a skilled person working in the field without changing the general principles of the invention as outlined herein, and such modifications and alternatives are considered to be within the spirit and scope of the invention.

We claim:

1. A brake system for a wheel of a wheelchair comprising:
   a first mounting bracket adapted to be connected to a frame portion of a wheelchair,
   a handle pivotally attached at a pivot point to the mounting bracket,
   a cable having a first end connected to the handle and a second end connected to a pivot arm;
   said pivot arm being pivotally attached to one end of a rod;
   said rod attached to a second mounting bracket adapted to be connected to another frame portion of the wheelchair;
   a braking mechanism connected to a portion of the rod and biased into engagement with a brake element by a spring;
   said brake element adapted to be connected to a hub of the wheel chair,
   wherein;
   upon pivoting of the handle past a certain rotary position with respect to said pivot point, either in a forward or rearward direction by the wheelchair occupant, said spring forces said braking mechanism into either a positive braking engagement with said brake element, thereby locking the wheelchair against movement, or a released position in which the wheelchair is free to move.

2. A brake system for a wheelchair as claimed in claim 1 wherein said brake element is a disc element having splines or teeth circumferentially spaced thereon and wherein said braking mechanism is a latching mechanism which engages said splines or said teeth to lock the wheelchair against movement.

3. A brake system for a wheelchair as claimed in claim 1 wherein said braking mechanism has a conical taper at a portion where it engages similar tapered splines on said braking element.

4. A brake system for a wheelchair as claimed in claim 1 wherein said braking mechanism has adjustment holes therein to allow for width adjustment of the wheel of the wheel chair.

5. A brake system for a wheelchair as claimed in claim 1 wherein said rod is a cam rod.

6. A brake system for a wheelchair as claimed in claim 1 wherein said cable, near said first end thereof, is pivotally connected to the first mounting bracket and said cable, near said second end thereof, is adapted to be pivotally connected to the second mounting bracket.

7. A brake system as claimed in claim 1 for another wheel of the wheel chair and capable of being actuated by said handle.

* * * * *